(12) United States Patent
Kekki

(10) Patent No.: US 7,554,906 B2
(45) Date of Patent: Jun. 30, 2009

(54) METHOD FOR MANAGING CONNECTION RESOURCES

(75) Inventor: Sami Kekki, Helsinki (FI)

(73) Assignee: Nokia Corporation, Espoo (FI)

( * ) Notice: Subject to any disclaimer, the term of this patent is extended or adjusted under 35 U.S.C. 154(b) by 807 days.

(21) Appl. No.: 10/751,922

(22) Filed: Jan. 7, 2004

(65) Prior Publication Data

US 2004/0136403 A1 Jul. 15, 2004

Related U.S. Application Data

(63) Continuation of application No. PCT/FI02/00330, filed on Apr. 22, 2002.

(30) Foreign Application Priority Data

Jul. 11, 2001 (FI) .................................. 20011520

(51) Int. Cl.
*G08C 15/00* (2006.01)
(52) U.S. Cl. ..................... 370/229; 370/310.1; 370/468
(58) Field of Classification Search ................. 370/229, 370/468, 310.1, 395.64, 433
See application file for complete search history.

(56) References Cited

U.S. PATENT DOCUMENTS

| 6,198,728 | B1* | 3/2001 | Hulyalkar et al. | ........ 370/310.1 |
| 6,359,863 | B1* | 3/2002 | Varma et al. | ................ 370/232 |
| 6,671,367 | B1* | 12/2003 | Graf et al. | .................... 379/229 |
| 6,711,126 | B1* | 3/2004 | Besset-Bathias | ............ 370/229 |
| 6,930,994 | B1* | 8/2005 | Stubbs | ........................ 370/348 |
| 2002/0131375 | A1* | 9/2002 | Vogel et al. | .................. 370/322 |

FOREIGN PATENT DOCUMENTS

EP 0 573 739 A2 * 12/1993
WO WO 97/22224 6/1997

OTHER PUBLICATIONS

Eneroth, G.; Fodor, G.; Leijonhufvud, G.; Racz, A.; Szabo, I., "Applying ATM/AAL2 as a switching technology in third-generation mobile access networks," Communications Magazine, IEEE, vol. 37, No. 6, pp. 112-122, Jun. 1999.*

* cited by examiner

*Primary Examiner*—Hassan Kizou
*Assistant Examiner*—Jeffrey M Rutkowski
(74) *Attorney, Agent, or Firm*—Squire, Sanders & Dempsey L.L.P.

(57) ABSTRACT

The fundamental idea in the invention is as follows. Instead of setting up and releasing a bearer, e.g. an AAL2 connection, the connection is maintained and only modified to have either a zero bandwidth or the required bandwidth. The zero bandwidth corresponds to a release in the conventional case and the required bandwidth corresponds to the setup of the connection. The invention is especially applicable in the cases where it is reasonable to assume that a connection once established and currently/no longer needed, that usually can be an AAL2 connection, will be needed again after a reasonably short period of time. However, the invention is applicable also in the general case where the AAL2 connections are initially set up with zero or small resources and then modified afterwards to an appropriate bandwidth on demand.

23 Claims, 8 Drawing Sheets

METHOD FOR MANAGING CONNECTION RESOURCES

This is a Continuation of International Application No. PCT/FI02/00330 filed Apr. 22, 2002, which designated the U.S. and was published under PCT Article 21 (2) in English.

FIELD OF THE INVENTION

The present invention relates to telecommunication systems. In particular, the present invention relates to a novel and improved method for managing connection resources in a telecommunications network.

BACKGROUND OF THE INVENTION

In the current specifications of the third generation mobile networks (referred to as UMTS), the system utilises the same well-known architecture that has been used by all main second generation systems. A block diagram of the system architecture of the current UMTS network is presented in FIG. 1. The UMTS network architecture includes the core network (CN), the UMTS terrestrial radio access network (UTRAN), and the user equipment (UE). The core network is further connected to the external networks, i.e. the Internet, PSTN and/or ISDN.

The UTRAN architecture consists of several radio network subsystems (RNS). The RNS is further divided into the radio network controller (RNC) and several base stations (BTS, referred to as Node B in the 3GPP specifications). In this architecture there are several different connections between the network elements. The Iu interface connects CN to UTRAN. The Iur interface enables the exchange of signalling information between two RNCs. There is no equivalent interface to Iur in the architectures of the second generation mobile networks. The signalling protocol across the Iur interface is called the radio network subsystem application part (RNSAP). The RNSAP is terminated at both ends of the Iur interface by an RNC. The Iub interface connects an RNC and a Node B. The Iub interface allows the RNC and Node B to negotiate about radio resources, for example, to add and delete cells controlled by Node B to support communication of dedicated connection between UE and S-RNC, information used to control the broadcast and paging channels, and information to be transported on the broadcast and paging channels. One Node B can serve one or multiple cells. UE is connected to Node B through the Uu radio interface. UE further consists of a subscriber identity module (USIM) and mobile equipment (ME). They are connected by the Cu interface. Connections to external networks are made through Gateway MSC (towards circuit switched networks) or GGSN (towards packet switched networks).

The general protocol model for UTRAN Interfaces is depicted in FIG. 2, and described in detail in the following. The structure described is based on the principle that the layers and planes are logically independent of each other.

The Protocol Structure consists of two main layers, Radio Network Layer and Transport Network Layer. These are presented in the horizontal planes of FIG. 2. All UTRAN related issues are visible only in the Radio Network Layer, and the Transport Network Layer represents the standard transport technology that is selected to be used for UTRAN. UTRAN has certain specific requirements for TNL. For instance, the real time requirement, i.e. the transmission delay has to be controlled and kept small.

The Control Plane includes the Application Protocol, i.e. RANAP (RANAP, Radio Access Network Application Part), RNSAP (RNSAP, Radio Network Subsystem Application Part) or NBAP (NBAP, Node B Application Part), that is a part of RNL, and the Signalling Bearer, that is a part of TNL, for transporting the Application Protocol messages.

Among other things, the Application Protocol is used for setting up bearers (i.e. Radio Access Bearer or Radio Link) in the Radio Network Layer. In the three plane structure the bearer parameters in the Application Protocol are not directly tied to the User Plane transport technology, but are rather general bearer parameters.

The Signalling Bearer for the Application Protocol may or may not be of the same type as the Signalling Bearer for the ALCAP (ALCAP, Access Link Control Application Part). ALCAP is a generic name to indicate the protocol(s) used to establish data transport bearers on the Iu, Iur and Iub interfaces. AAL2 Signalling protocol Capability Set 2 (ITU-T Q.2630.2, a.k.a Q.aal2 CS-2) is the selected protocol to be used as ALCAP in UTRAN. Q.2630.2 adds new optional capabilities to Q.2630.1. The following should also be noted: data transport bearers may be dynamically established using ALCAP, or pre-configured and transport bearers may be established before or after allocation of radio resources. The Signalling Bearer is always set up by O & M (O & M, Operating and Maintenance) actions.

The User Plane Includes the Data Stream(s) and the Data Bearer(s) for the Data Stream(s). The Data Stream(s) is/are characterised by one or more frame protocols specified for that interface.

The Transport Network Control Plane does not include any Radio Network Layer information, and is completely in the Transport Layer. It includes the ALCAP protocol(s) that is/are needed to set up the transport bearers (Data Bearer) for the User Plane. It also includes the appropriate Signalling Bearer(s) needed for the ALCAP protocol(s) and for RANAP, RNSAP and NBAP protocols.

The Transport Network Control Plane is the Control plane of the Transport Network Layer. Its function is to control the transport bearers (setup/release/modify) in the Transport Network Layer. The introduction of the Transport Network Control Plane makes it possible for the Application Protocol in the Radio Network Control Plane to be completely independent of the technology selected for the Transport Bearer in the User Plane.

When a Transport Network Control Plane is used, the transport bearers for the Data Bearers in the RNL User Plane are set up in the following fashion. First there is a signalling transaction by the Application Protocol in the RNL Control Plane, which triggers the set up of the Data Bearer by the ALCAP protocol that is specific for the User Plane technology of the TNL.

The independence of RNL and TNL assumes that an ALCAP signalling transaction takes place. It should be noted that ALCAP might not be used for all types of Data Bearers. If there is no ALCAP signalling transaction, the Transport Network Control Plane is not needed at all. This is the case when pre-configured Data Bearers are used.

The Data Bearer(s) in the User Plane, and the Signalling Bearer(s) for the Application Protocol, belong also to the Transport Network User Plane. The Data Bearers in the Transport Network User Plane are directly controlled by the Transport Network Control Plane during a real time operation, but the control actions required for setting up the Signalling Bearer(s) for the Application Protocol are considered to be O&M actions.

The ATM Adaptation Layer (AAL) performs functions required by the user, control and management planes and supports the mapping between the ATM layer and the next higher layer. The functions performed in the AAL depend upon the higher layer requirements. In short, the AAL supports all the functions required to map information between the ATM network and the non-ATM application that may be using it. In UTRAN, the users of the AAL (i.e., the next higher layer) are the Radio Network Layer data streams, represented to AAL as Frame Protocol connections.

AAL 2 provides bandwidth-efficient transmission of low-rate, short and variable packets for delay sensitive applications, and is designed to make use of the more statistically multiplexable Variable Bit Rate ATM Traffic Classes. Therefore, AAL2 is not limited to ATM connections using the CBR Traffic Class, and can enable voice applications using higher layer requirements such as voice compression, silence detection/suppression, and idle channel removal. The structure of AAL2 allows network administrators to take traffic variations into account in the design of an ATM network and to optimise the network to match traffic conditions.

The ITU-T Recommendation Q.2630.2 AAL type 2 Signalling Protocol (Capability Set 2) specifies the inter-node protocol and nodal functions that control AAL type 2 point-to-point connections. FIG. 3 is showing an example of the use of Q.2630.2 in the UTRAN context, for the different interfaces. Further, the 3GPP Technical Specifications TS25.430 (chapter 4.5) and TS25.420 (chapter 6.4) specify the mapping between a transport channel (a Radio Network Layer object) and a transport bearer (a Transport Network Layer object). The rule is that there is a dedicated transport bearer for each Dedicated Channel (DCH) and for each individual user stream of the Downlink Shared Channel (DSCH). The users of Common Channels (Random Access Channel (RACH), Common Packet Channel (CPCH) and the Forward Access Channel (FACH)) can share a transport bearer.

The AAL2 transport bearers are established and released by AAL2 signalling, specified in ITU-T Recommendation Q.2630.2. The approach taken by 3GPP is a straightforward one; a new transport bearer is established on demand and released when the demand no longer exists.

In UMTS Release 4 the Transport Network Layer capabilities were further enhanced by replacing the Q.2630 Capability Set 1 with the Capability Set 2 (Q.2630.2). CS-2 has a connection modification capability that allows the modification of the characteristics of an existing AAL2 connection in a lightweight manner. This feature was specified to be used in cases where the bandwidth of the corresponding transport channel is changed, dramatically enough, during its lifetime.

In the current approach there is the following fundamental problem: the establishment and release of an AAL2 connection are heavier tasks than it was originally assumed. As a result the setup and release procedures take a longer time. It can be estimated that e.g., in certain UTRAN environments the setup delay can be a couple of hundred milliseconds at its maximum while in some specifications it has been (implicitly) assumed that it takes only some tens of milliseconds. The setup delay is dependent both on the Network Element implementation and on the transport network architecture.

The setup delay is a critical factor especially in case of transport channels conveying bursty packet traffic. In this case the lifetime of a transport channel can be very short, in the order of hundreds of milliseconds to some seconds. For the sake of efficiency in using the Radio Resources it is beneficial to minimise the setup delay of the transport bearers so that the Radio Resource Management decision to start using e.g., a DCH can be realised in as short time as possible and without any additional delay.

The objective of the present invention is to provide a method for the problem caused by a delay in the connection setup, specifically in the transport bearer setup as far as perceived by the Radio Network Layer (RNL). Furthermore, the objective of the present invention is, from the RNL and the radio resource utilisation viewpoints, to reduce the time it takes to make the underlying Iub and/or Iur transport bearer available as small as possible.

The invention is characterised by what is disclosed in the independent claims.

SUMMARY OF THE INVENTION

The fundamental idea in the invention is as follows. Instead of setting up and releasing a transport bearer, e.g. an AAL2 connection, the connection is maintained and only modified to have either a zero bandwidth or the required bandwidth. The zero bandwidth corresponds to a release in the conventional case and the required bandwidth corresponds to the setup of the connection.

Generally speaking, the invention is designed to modify an existing modifiable connection whenever the needs of a connection user or of an instance or entity are changing. When the entity is not needing or using the connection, it is modified to a zero or nominal bandwidth, and when the entity is needing or using the connection, it is modified to the bandwidth required by the entity. When the bandwidth is modified "up", the entity using the connection is not necessarily the same entity that used the connection earlier.

The invention is especially applicable in the cases where it is reasonable to assume that a connection once established and currently no longer needed, that usually can be an AAL2 connection, will be needed again after a reasonably short period of time. However, the invention is applicable also in the general case where the AAL2 connections are initially set up with zero or small resources and then modified afterwards to an appropriate bandwidth on demand.

It is emphasised that during the modification procedure the Connection Admission Control (CAC, Connection Admission Control), that is a checking function in ATM, may perform the check on available resources for the modified connection. The outcome may be that there are no resources available any longer and the modification cannot be done. However, this is not considered to be any drawback of the invention as the resources won't then be available in the conventional case either. However, it is still possible to implement a more intelligent CAC that is able to take into account the existence of a zero or small bandwidth connections (if modified to a "small" bandwidth instead of a zero bandwidth) and to keep some resource margin available for these connections just in case they would be needed soon.

The benefit in using the modification procedure of the present invention is that the further control of the connection after its initial setup is now lightweight as compared to the case in which the connection is always set up and then released. This is because of the fact that the modification deals with an existing connection. The connection has already been routed through all the involved resources and nodes, i.e. originating, transit and destination AAL2 nodes, the input and output ports for the connection have been determined in these nodes, and the connection "context" has been created already in all involved nodes (allocation of Connection Element ID and Signalling Association ID), etc.

Correspondingly, the Q.2630 Modify Request message is carrying only a fraction of the information that is carried by the Q.2630 Establish Request message (that is used in setting up a new connection). Consequently, the modification of the connection can be performed in a (potentially significantly) shorter time than the establishment of the connection.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

In the following, three different embodiments of the present invention are described. It is to be noted that these examples are presented relating to the UTRAN and AAL2 connections, but the invention is not to be restricted to these. The invention is as well applicable in all applications where it is possible to maintain and modify the connection instead of its release and setup.

Figure 1:
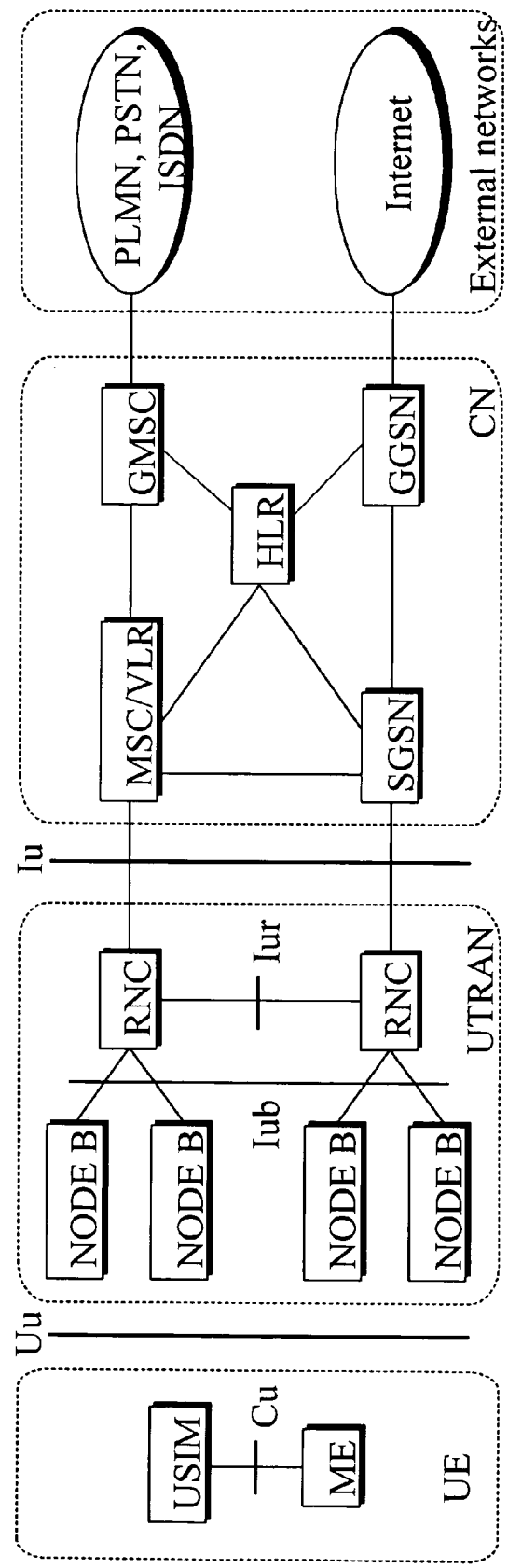
FIG. 1 is a block diagram illustrating an example of the state of the art scenario relating to the present mobile network.
Figure 2:
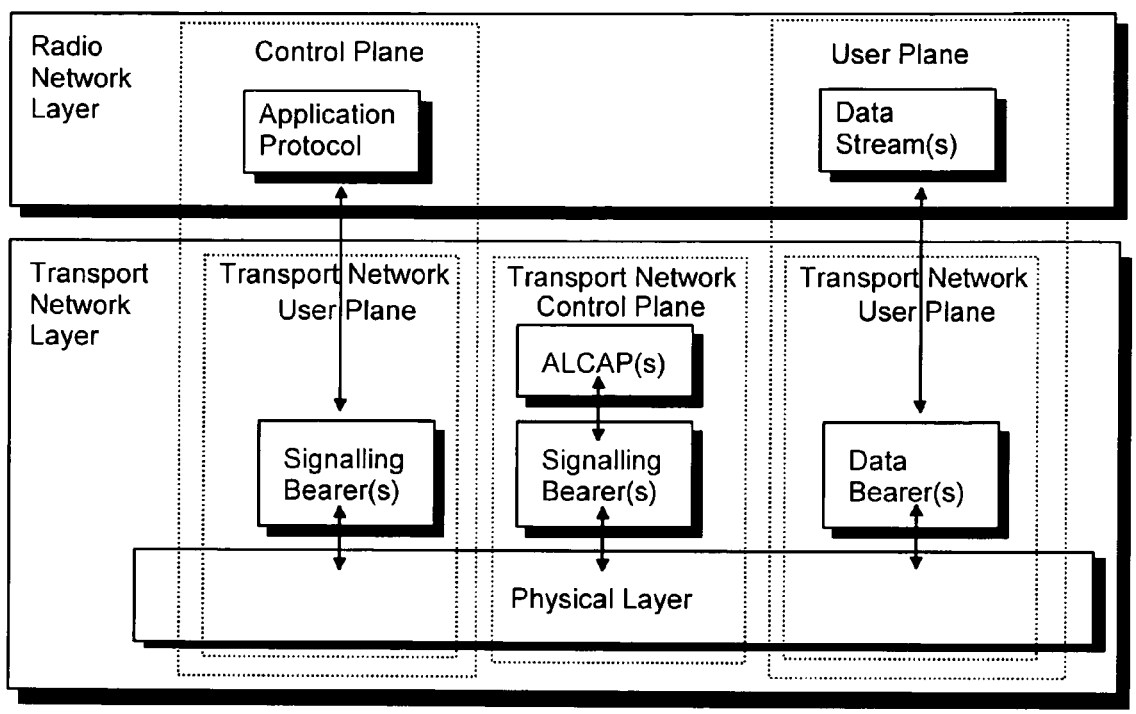
FIG. 2 is a general protocol model for UTRAN interfaces of FIG. 1.
Figure 3:
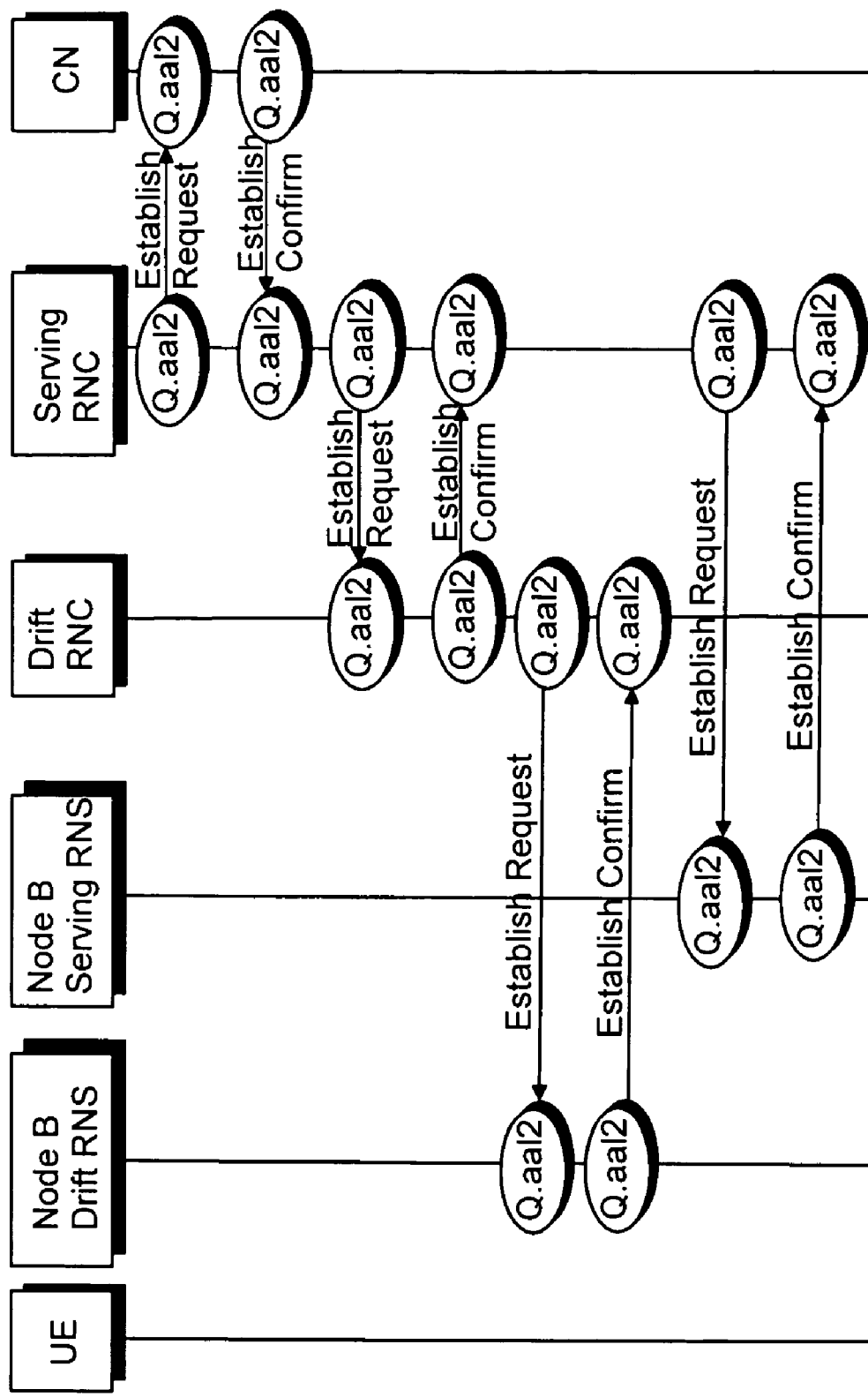
FIG. 3 is a signalling diagram illustrating an example of the use of Q.2630.2 in the UTRAN context.
Figure 4:
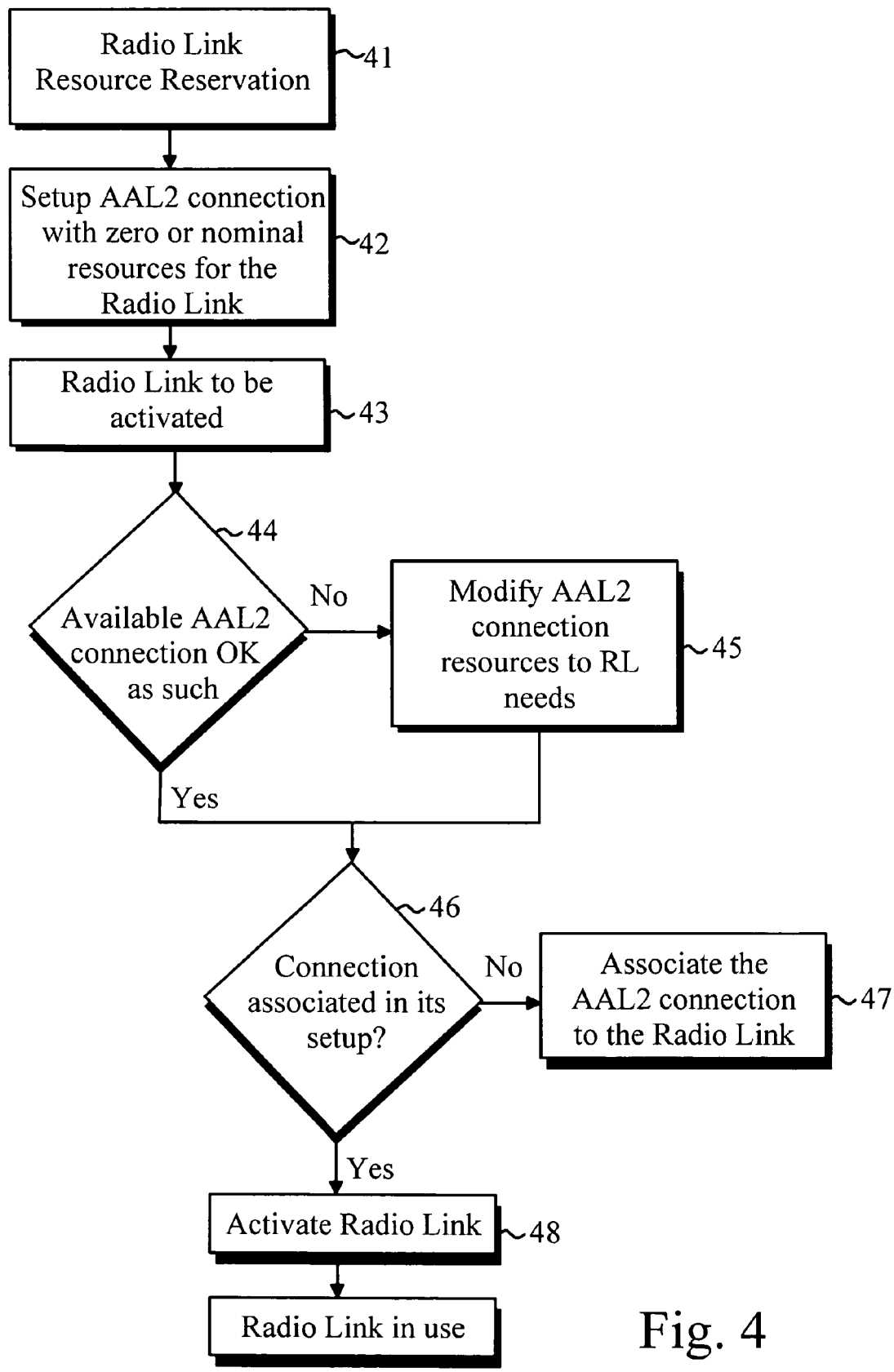
FIG. 4 is a flow diagram that describes one embodiment of the present invention.

In FIG. 4, the separation of resource reservation and Radio Link activation is described in further detail. This is very well applicable in optimising the usage of radio resources in UTRAN by allowing the radio resources to be reserved in advance and then to activate the corresponding radio link only afterwards without any additional delay (caused by the actual resource reservation).

In this embodiment, if the conventional way of controlling the transport bearers was used, the transport would be needed to be set up when the radio resources are reserved. Otherwise the delay benefit may become negligible because of the delay introduced by the transport bearer setup during the Radio Link activation. With the mechanism according to the present invention the transport bearer is set up during the radio resource reservation. The bandwidth of the transport bearer is set to zero or to a small value. Then during the activation only the Modify Request is send to modify the already existing bearer to a required capacity.

At step 41 of FIG. 4, the Radio Link Resource Reservation is performed as in the conventional procedure. After this, AAL2 connection is set up with zero or nominal resources for the Radio Link, step 42. Nominal resource here refers to some (small) default bandwidth and QoS (QoS, Quality of Service). Then the Radio Link is to be activated, step 43. During this, it is checked whether the available AAL2 connection is suitable as such or not, step 44. If it is suitable, it is checked whether the connection was associated for the Radio Link in its setup or not, step 46. If the connection at step 44 is not suitable as such, it is modified according to the Radio Link's resource needs, step 45, and after the modification the process continues at step 46. If the connection is not associated in its setup, then it is associated for the Radio Link at step 47. Finally, the Radio Link is activated for use, step 48.

It is to be noted that the order between the modification and association is not critical and they can be performed in any order.

Figure 5A:
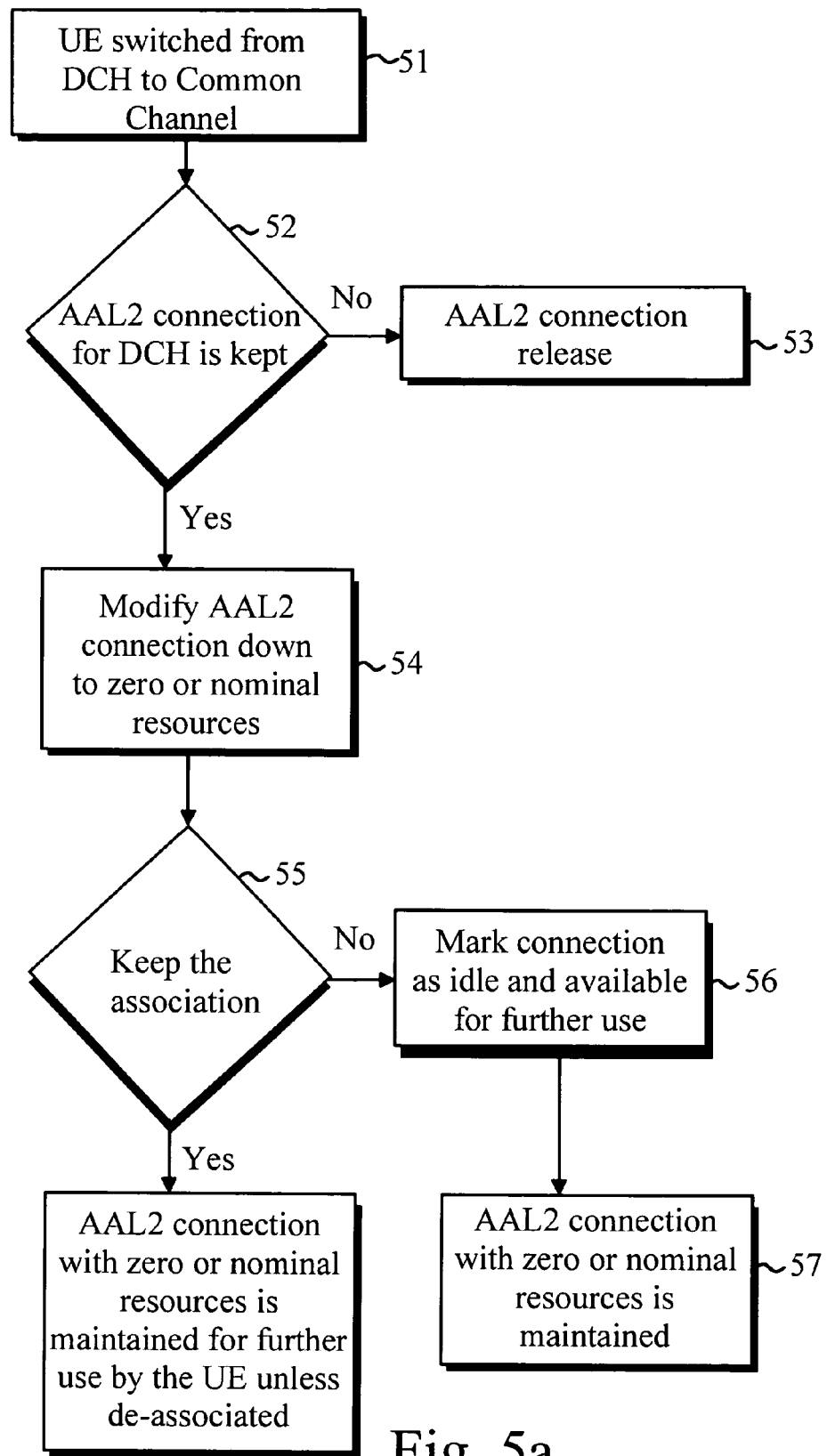
FIGS. 5a-5b are flow diagrams that describe another embodiment of the present invention.

The second embodiment of the present invention is a Transport channel type switch between Cell_DCH (DCH, Dedicated Channel) and Cell_FACH (FACH, Forward Access Channel) states. This is described in FIGS. 5a and 5b. In the example of FIG. 5a, an UE is switching its state between a cell-FACH and a cell-DCH state. That is, the UE is using a Dedicated transport channel every now and then and then it is switched to a Common Channel, step 51. The switch is based e.g., on the amount of information the UE or the network has to send. After switching the UE from cell-DCH to cell-FACH, a check is made to ensure if the AAL2 connection is kept or not, step 52. According to the present invention, the underlying AAL2 connection that was used for the conveyance of the released DCH is not released, step 52 (as would be the case in the conventional approach, step 53, as otherwise it would result in wasting the transport resources), but the AAL2 connection is only modified to a smaller or zero bandwidth, step 54.

After this it is checked whether the association is to be kept or not, step 55. If the association is not kept, step 56, then the AAL2 connection is marked as idle and available for further use by any user. The connection is maintained at a zero or nominal bandwidth, step 57. If at step 55 the association is kept, then the AAL2 connection with a zero or nominal bandwidth is maintained for further use by the UE, step 58.

Figure 5B:
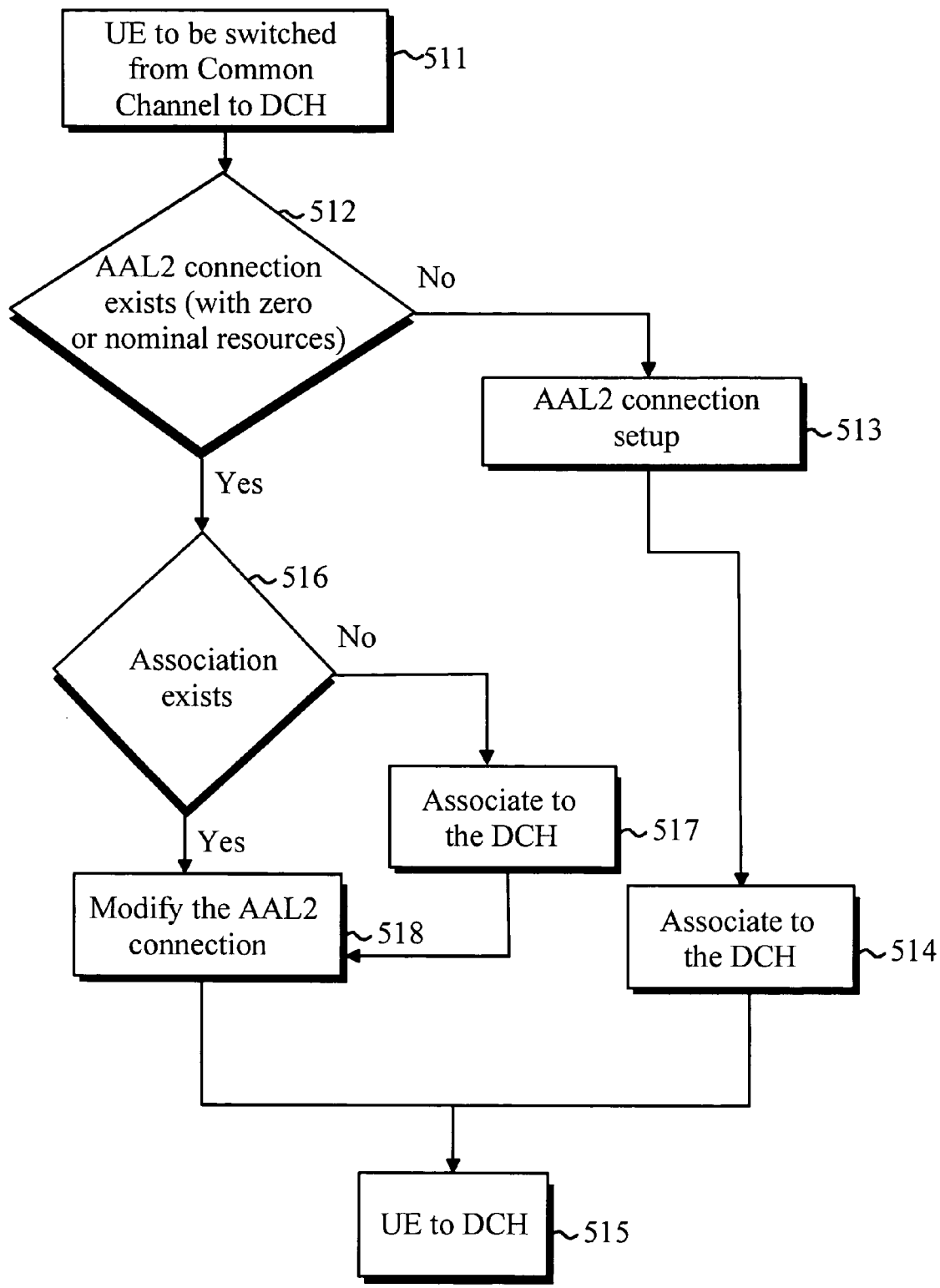

In the example of FIG. 5b, a UE is switching its state to cell-DCH, step 511. At step 512 it is checked if an AAL2 connection with a zero or nominal bandwidth exists. The conventional procedure would assume that the connection does not exist, which means that it has to be set up, step 513, and then associated for the DCH, step 514. After this the UE is switched to a DCH state, step 515. If the connection exists, as it is according to the present invention, it is checked if there is an association for the connection, step 516. If no, then the association is made, step 517. After the association is made or if there had been an associated connection, the connection is modified according to the needs of the UE, step 518.

Figure 6A:
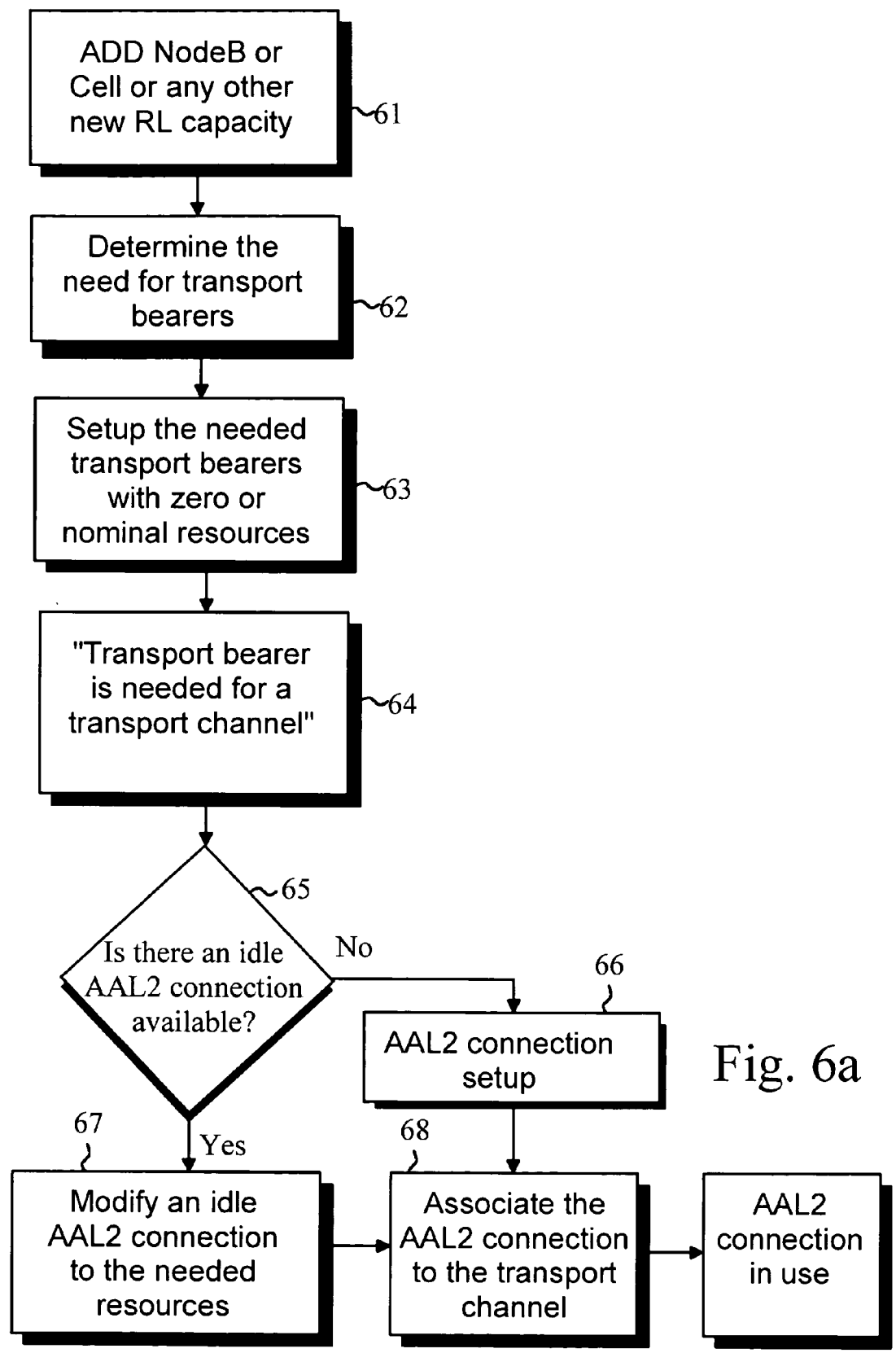
FIGS. 6a-6b are flow diagrams that describe another embodiment of the present invention.
Figure 6B:
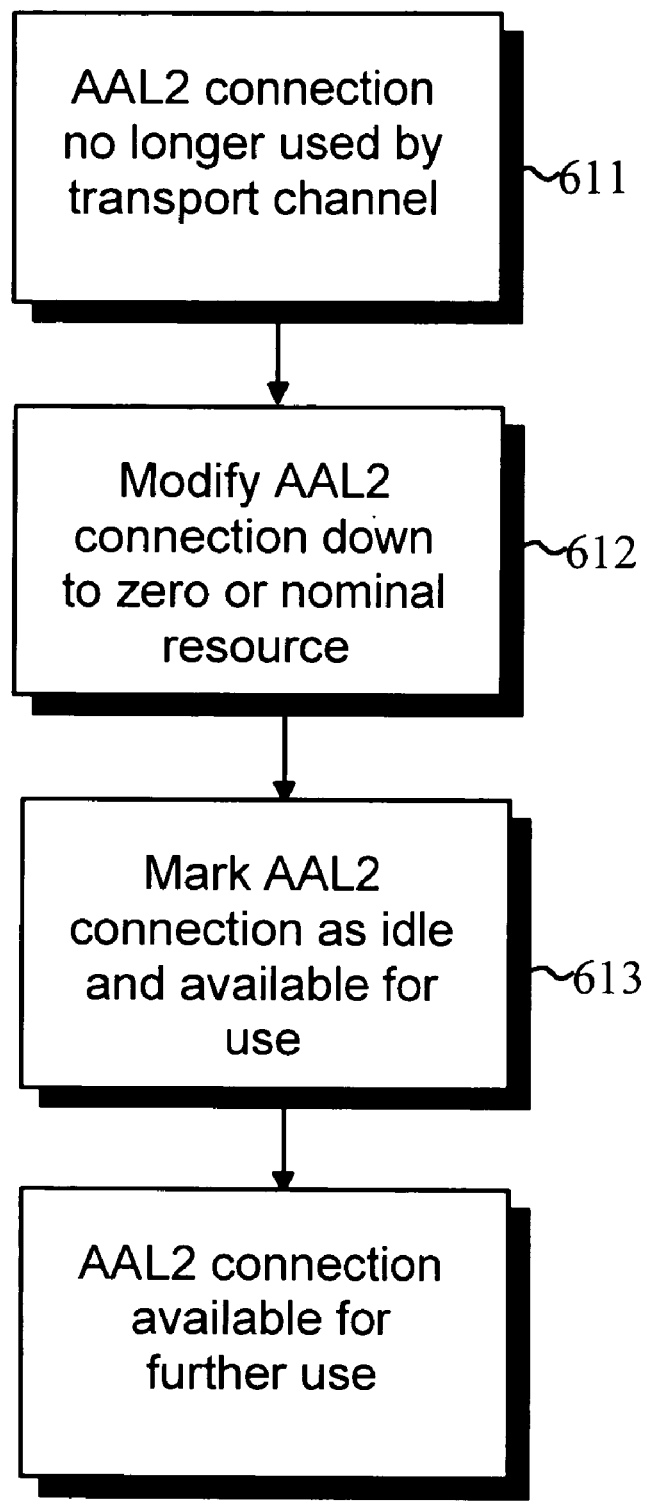

The third example relating to the pre-established AAL2 connections with a zero or small capacity is presented in FIGS. 6a and 6b. In this example, a number of AAL2 connections (even the maximum number the system supports) are established when the system is taken into operation. All AAL2 connections are allocated a zero or a small amount of bandwidth. For example, when a new Node B is taken into use the Iub transport bearers are set up as a background process over the Iub. Then as soon as there is a need for a transport bearer, one of the available ones is modified to the required bandwidth.

At first a new Node B or Cell or corresponding Radio Link capacity in the cell is added, step 61. Then the need for transport bearers, i.e. the number of the necessary bearers and the number of the termination points is determined, step 62. Then the necessary transport bearers are set up with a zero or nominal bandwidth, step 63. During the active state of the system, there eventually comes a situation in which a transport bearer is needed for a transport channel (e.g., for a DCH), step 64. Immediately after this it is determined, if there is an idle AAL2 connection available, step 65. If there is one, then it is modified according to the necessary resources, step 67. If there is no available connection, as it is in the conventional case, then the AAL2 connection has to be set up, step 66. When the AAL2 connection is either modified or set up, it is associated to the transport channel, step 68.

When the AAL2 connection is no longer used by the transport channel, step 611 in FIG. 6b, the releasing of the resources is as follows. At first the bandwidth of the AAL2 connection is modified down to a zero or nominal bandwidth, step 612, and then it is marked as an idle and available connection for later use, step 613.

It is obvious to a person skilled in the art that with the advancement of technology, the basic idea of the invention may be implemented in various ways and in various network environments The invention and its embodiments are thus not limited to the examples described above, instead they may vary within the scope of the claims.

The invention claimed is:

1. A method, comprising:
managing transport bearers in a mobile telecommunication network, wherein an asynchronous transfer mode adaptation layer 2 transport bearer is allocated on demand of a radio link using said asynchronous transfer mode adaptation layer 2 transport bearer, the managing comprising,
creating a number of modifiable asynchronous transfer mode adaptation layer 2 transport bearers during system initialization and setting a bandwidth of the modifiable asynchronous transfer mode adaptation layer 2 transport bearers to a nominal or zero bandwidth,
modifying a bandwidth of an existing asynchronous transfer mode adaptation layer 2 transport bearer to one of a nominal and zero bandwidth in response to said radio link using said existing asynchronous transfer mode adaptation layer 2 transport bearer being inactivated, and
modifying the bandwidth of said existing asynchronous transfer mode adaptation layer 2 transport bearer to a bandwidth required by said radio link using said existing asynchronous transfer mode adaptation layer 2 transport bearer in response to said radio link using said existing asynchronous transfer mode adaptation layer 2 transport bearer being activated.

2. The method according to claim 1, further comprising:
creating a modifiable connection during a resource allocation for a connection user if there is no existing connection;
setting the bandwidth of the modifiable connection to a nominal or zero bandwidth; and
modifying the modifiable connection during the activation of the connection to a required capacity.

3. The method according to claim 2, further comprising:
checking an availability of the modifiable connection during the activation of the connection user.

4. The method according to claim 3, further comprising:
if the modifiable connection is available, associating the modifiable connection to a usage of an activated connection user.

5. The method according to claim 2, wherein the creating of the modifiable connection further comprises:
routing a connection through involved resources; and
determining input and output ports in each node involved in the connection.

6. The method according to claim 2, wherein the modifiable connection is an asynchronous transfer mode adaptation layer 2 connection.

7. The method according to claim 2, wherein the connection user is a frame protocol connection.

8. The method according to claim 1, further comprising:
determining a need of the modifiable connections before the number of connections are created.

9. The method according to claim 8, further comprising:
checking from a number of the modifiable connections if there is an idle connection available.

10. The method according to claim 8, further comprising:
associating a modifiable connection for an activated connection user.

11. The method according to claim 8, wherein at the determining the need for the modifiable connections a number of connection users and a number of termination points are determined.

12. The method according to claim 1, further comprising:
reserving a resource margin for the connections which have a zero bandwidth.

13. An apparatus, comprising:
a processor configured to manage transport bearers in a mobile telecommunication network, wherein an asynchronous transfer mode adaptation layer 2 transport bearer is allocated on demand of a radio link using said asynchronous transfer mode adaptation layer 2 transport bearer, the processor being configured to,
create a number of modifiable asynchronous transfer mode adaptation layer 2 transport bearers during system initialization and set a bandwidth of the modifiable asynchronous transfer mode adaptation layer 2 transport bearers to a nominal or zero bandwidth,
modify the bandwidth of an existing asynchronous transfer mode adaptation layer 2 transport bearer to one of a nominal and zero bandwidth in response to said radio link using said existing asynchronous transfer mode adaptation layer 2 transport bearer being inactivated, and
modify the bandwidth of said existing asynchronous transfer mode adaptation layer 2 transport bearer to a bandwidth required by said radio link using said existing asynchronous transfer mode adaptation layer 2 transport bearer in response to said radio link using said existing asynchronous transfer mode adaptation layer 2 transport bearer being activated; and
an interface device configured to enable the processor to communicate with one or more network devices of the mobile telecommunication network.

14. The apparatus of claim 13, wherein the processor is further configured to create a modifiable connection during a resource allocation for a connection user if there is no existing connection, set the bandwidth of the modifiable connection to a nominal or zero bandwidth, and modify the modifiable connection during the activation of the connection to a required capacity.

15. The apparatus of claim 14, wherein the processor is further configured to check an availability of the modifiable connection during the activation of the connection user.

16. The apparatus of claim 15, wherein the processor is further configured to associate the modifiable connection to a usage of an activated connection user.

17. The apparatus of claim 14, wherein the processor is further configured to route a connection through involved resources and determine input and output ports in each node involved in the connection, in order to create the modifiable connection.

18. The apparatus of claim 14, wherein the connection user is a frame protocol connection.

19. The apparatus of claim 13, wherein the processor is further configured to determine a need of the modifiable connections before the number of connections are created.

20. The apparatus of claim 19, wherein the processor is further configured to check from a number of the modifiable connections if there is an idle connection available.

21. The apparatus of claim 19, wherein the processor is further configured to associate a modifiable connection for an activated connection user.

22. The apparatus of claim 19, wherein the processor is further configured to determine the need for the modifiable connections by determining a number of connection users and a number of termination points.

23. The apparatus of claim 13, wherein the processor is further configured to reserve a resource margin for connections which have a zero bandwidth.

* * * * *